United States Patent [19]

Meacham

[11] 3,777,063

[45] Dec. 4, 1973

[54] TECHNIQUE FOR ALL-DIGITAL TELEVISION SYNC GENERATION

[75] Inventor: James H. Meacham, Laurel, Md.

[73] Assignee: Westinghouse Electric Corporation, Pittsburgh, Pa.

[22] Filed: Jan. 27, 1972

[21] Appl. No.: 221,242

[52] U.S. Cl. .......... 178/69.5 G
[51] Int. Cl. .......... H04n 5/06
[58] Field of Search .......... 178/69.5 TV, 69.5 G

[56] References Cited

UNITED STATES PATENTS 2,748,188 5/1956 Stahl et al. .......... 178/69.5 G X

*Primary Examiner*—Robert L. Richardson
*Attorney*—F. H. Henson et al.

[57] ABSTRACT

An all digital design for the generation of standard television (TV) synchronizing (sync) signals employs bistable multivibrators which count down the frequency of a basic oscillator using modulo counting techniques. The oscillator frequency is determined by the smallest differential pulse width required in generating the EIA standard format and corresponds to the interval of time preceding the horizontal pulse also known as the horizontal front porch. The modulo counter intervals coincide exactly with a majority of the required EIA pulse widths, and the accuracy of each time interval remains within specification to the same tolerance as the oscillator frequency, thereby affording significant improvement in temperature and jitter stability. The design of the invention facilitates deriving different television line and frame rates by changing only the oscillator frequency and selecting the desired modulo counters. The particular digital implementation lends itself readily to medium scale integration techniques such that the entire TV sync generator can be packaged into units about 1 inch square and one-fourth inch high exclusive of the crystal element required by the oscillator.

28 Claims, 15 Drawing Figures

TECHNIQUE FOR ALL-DIGITAL TELEVISION SYNC GENERATION

BACKGROUND OF THE INVENTION

1. Field of the Invention

This invention relates to the generation of television synchronizing signals and in particular to digital designs which provide signal waveforms in compliance with EIA standards.

2. State of the Prior Art

Standard television (TV) synchronizing (sync) signals established by the Electronic Industries Association (EIA) consist of mixed blank, composite sync, horizontal drive and vertical drive. Previous appraoches to the design of TV sync generators employing digital techniques have used adjustable monostable multivibrators to generate the required synchronizing signals. Each multivibrator including RC networks must be continuously aligned over temperature and aging variations to conform to the strict EIA specifications. More recent designs using digital techniques have employed ripple counters which reset at the desired TV line count and field count rates. The EIA required pulse widths are generated through simultaneous coincidence of a multiple of countdown states. To form the required pulses, logic elements receive as inputs the states of the various counters and perform AND and OR operations to yield required periodic pulses. The all digital approach using ripple counters is approximately twice as complex as the more common one-shot, monostable multivibrator, appraoch, but digital designs are implemented more readily in miniaturization through hybrid integrated circuit packaging.

SUMMARY OF THE INVENTION

The present invention utilizes the advantages of an all digital design, but overcomes the inferiority of ripple counters and resultant circuit complexity by the use of modulo counter techniques. The design based on modulo counters enables countdown intervals to coincide exactly with a majority of the required EIA signals thus eliminating the simultaneous coincidence logic required by the ripple counter approach. The modulo counter design affords a 25 to 40 percent reduction in circuit complexity over the ripple counter approach while maintaining all the desirable features of the all digital design.

To describe the invention, a particular citcuit implementation is used on a TV raster of 525 lines and an interlaced frame rate of 30 frames per second. Based on a horizontal front porch requirement of 0.02H, where H is the horizontal line frequency, a basic frequency of 787.5KHZ is calculated as shown in the detailed description of the invention. A modulo counter of 25 divides the 787.5KHZ to yield twice the horizontal line frequency of 31.5KHZ. Multivibrators of the JK type then are employed to receive the particular states of the modulo 25 counters and produce as outputs the required horizontal waveforms of horizontal drive, sync and blank and, as well, equalizing pulses and vertical serration waveform.

Modulo counters again are employed to provide a division of 525 which reduces the 31.5KHZ to 60HZ for the vertical field frequency. JK multivibrators then receive as inputs particular waveforms of the modulo 525 counters and produce as outputs the required vertical waveforms of vertical drive and blank as well as the 9 line and 3 line signals. Further logic elements then combine the various modulo counter waveforms to produce the required composite sync and mixed blanking signals.

DETAILED DESCRIPTION OF THE INVENTION

Figure 1:
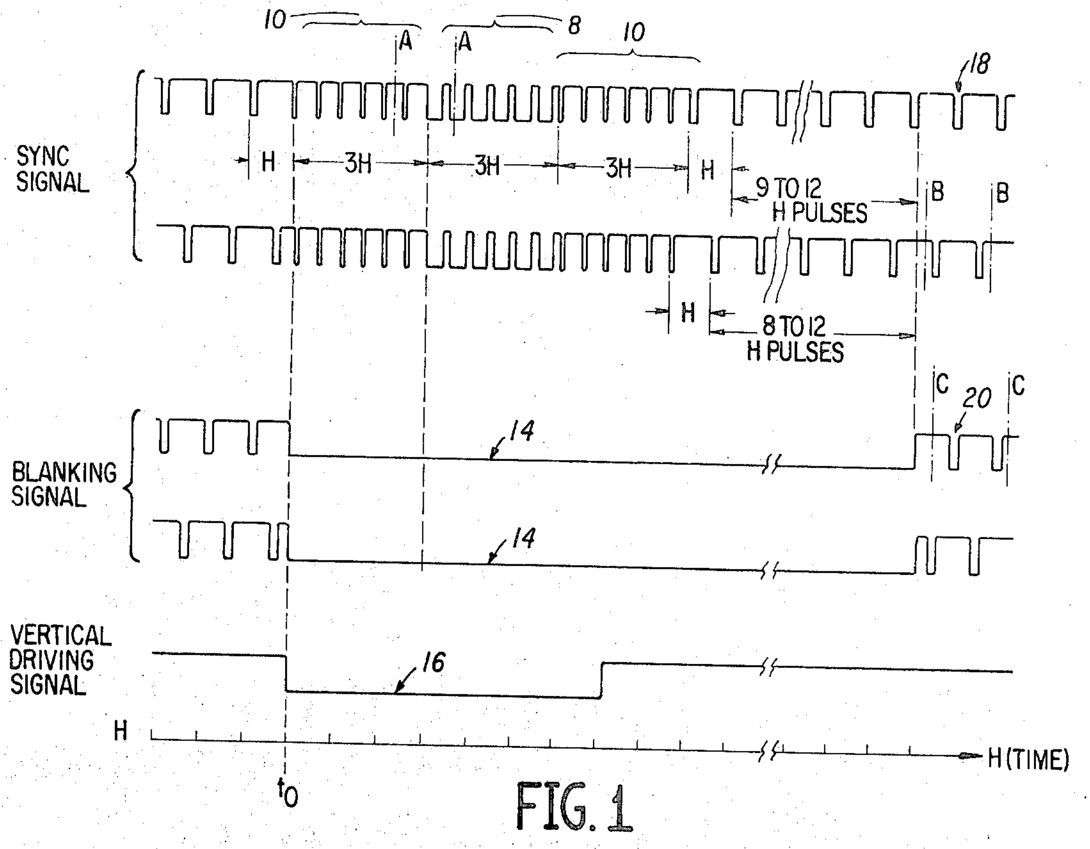
FIG. 1 is a chart illustrating the essential waveforms required by EIA standards for television.

The EIA standards for television synchronizing signals specifically describe composite waveforms for sync, blanking, and vertical driving signals. For convenience of illustrating timing relationships, the horizontal driving signal is shown in FIG. 2D. FIG. 1 shows the foregoing waveforms plotted against time in a relationship with H, the period of one horizontal scan line. Key elements of each wave are shown for the equalizing pulse interval 10, vertical sync pulse interval 12, blanking pulse 14, and vertical driving pulse 16. Two waveforms are shown for each of the signals 1 and 2, to illustrate time phasing differences in the choice of horizontal timing relative to vertical timing. The lower of each represents conditions required to provide interlaced scanning. Note that the horizontal scanning pulses 18 and the blanking pulses 20 continue in time until the period of vertical timing signals occur again and the waveforms of FIG. 1 again repeat.

Figure 2A:
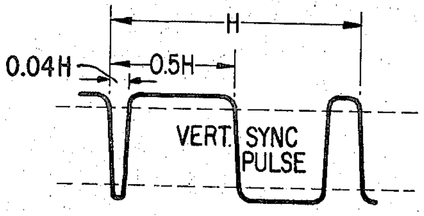
FIGS. 2A through 2D are charts illustrating in greater detail certain of the pulse waveforms within the television synchronizing signals.
Figure 2B:
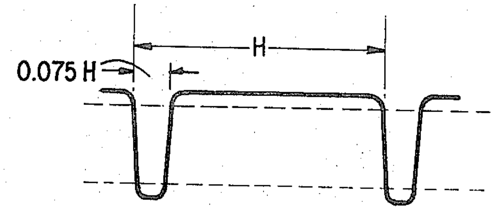
Figure 2C:
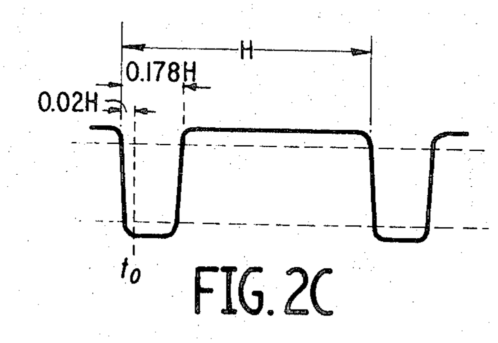
Figure 2D:
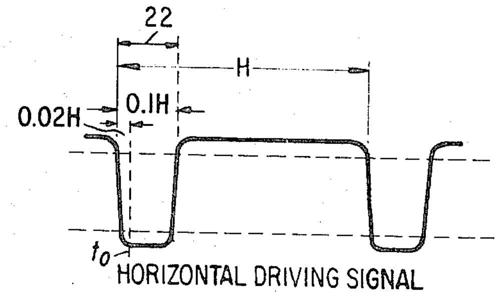

The portions A—A through C—C of FIG. 1 are shown in detail in FIGS. 2A to 2C, wherein are shown the time durations of various pulses, including the rise and fall times. As discussed later, the rise and fall, or decay, times establish the minimum time interval of 0.003H which must be reproduced; other time intervals include pulse widths varying from 0.04H to 0.178H where H is the period of one horizontal scan line. The waveform for the horizontal driving signal illustrates at 22 a pulse width of 0.1H.

The minimum resolvable time interval is determined by the time interval 22 shown in FIG. 2 and referred to as the front porch. From EIA standards, this time interval of period is given as 0.02H where H is the scan time of one horizontal line. TV synchronizing signals typically are controlled by and derived from a single crystal clock oscillator. For a 525 line raster TV generator which produces 30 interlaced frames a second, the oscillator frequency is calculated from the following:

$$T = 0.02H$$

$$T = 0.02 \times 63.4 \text{ usec.}$$

$$F = 1/T = 1/1.268 = 0.7875 \text{ MHZ}$$

$$\text{or } F = 787.5 \text{ KHZ}$$

This same formula may be applied to any horizontal scan time period.

A significant improvement to the method of deriving timing signals for TV sync generation is realized in accordance with the invention by employing modulo counting techniques. The design based on modulo counters enables countdown intervals to coincide exactly with a majority of the required EIA signals eliminating the simultaneous coincidence logic required for ripple counting and feedback reset control, as in prior art systems. Key features of this design include the F, of JK type bistable multivibrators or flip-flops and modulo counters which require no resetting. A basic oscillator frequency of 787.5 KHZ is selected for illustration.

Figures 3A, 3B:
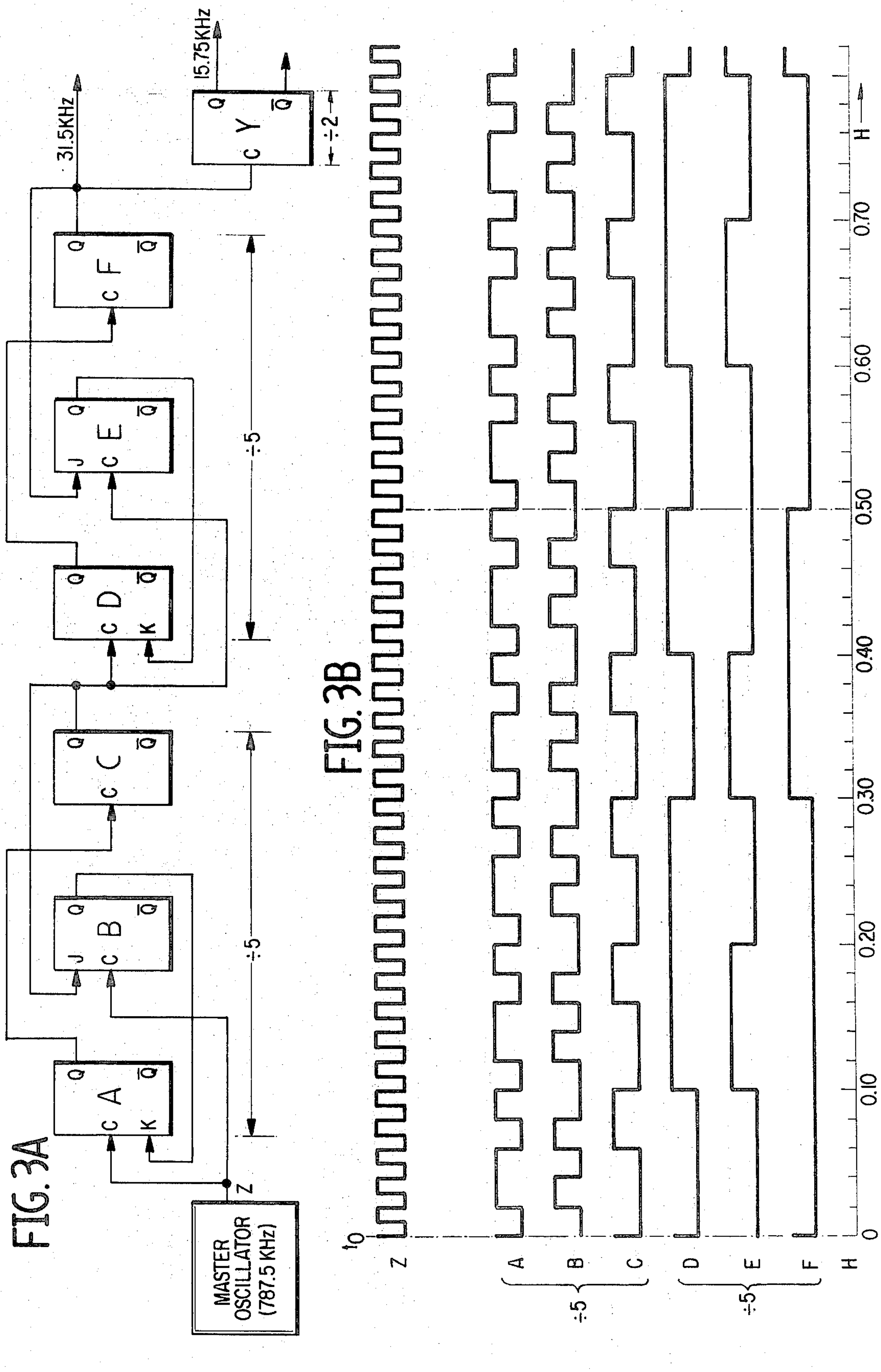
FIG. 3A is a block diagram of the modulo counter which provides the horizontal line countdown.
FIG. 3B illustrates the associated waveforms.

FIG. 3A shows the horizontal line countdown circuitry employing JK flip-flops A, B and C which provide a continuous division by 5. FIG. 3B shows the waveforms appearing at the outputs of flip-flops A, B and C, as identified by the corresponding letters. In FIG. 3A, the three further JK flip-flops D, E and F produce another division by 5 as shown by waveforms D, E and F, respectively, in FIG. 3B. The output frequency from flip-flop F is then 31.5 KHZ, and a further division by 2 is provided by bistable multivibrator Y, to yield the horizontal line frequency of 15.75 KHZ.

Figure 4A:
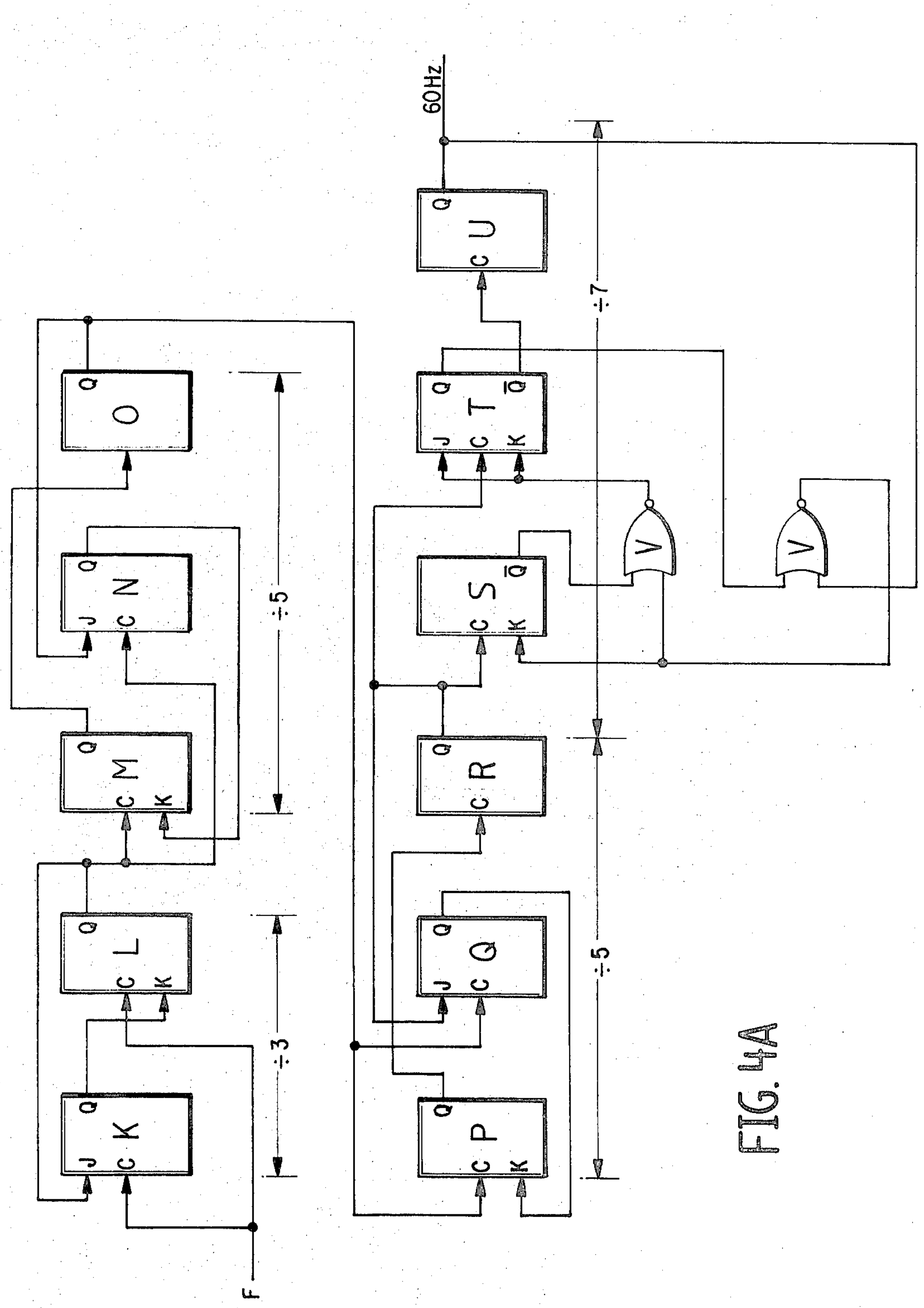
FIG. 4A is a block diagram of the modulo counter which provides the vertical field countdown.
Figure 4B:
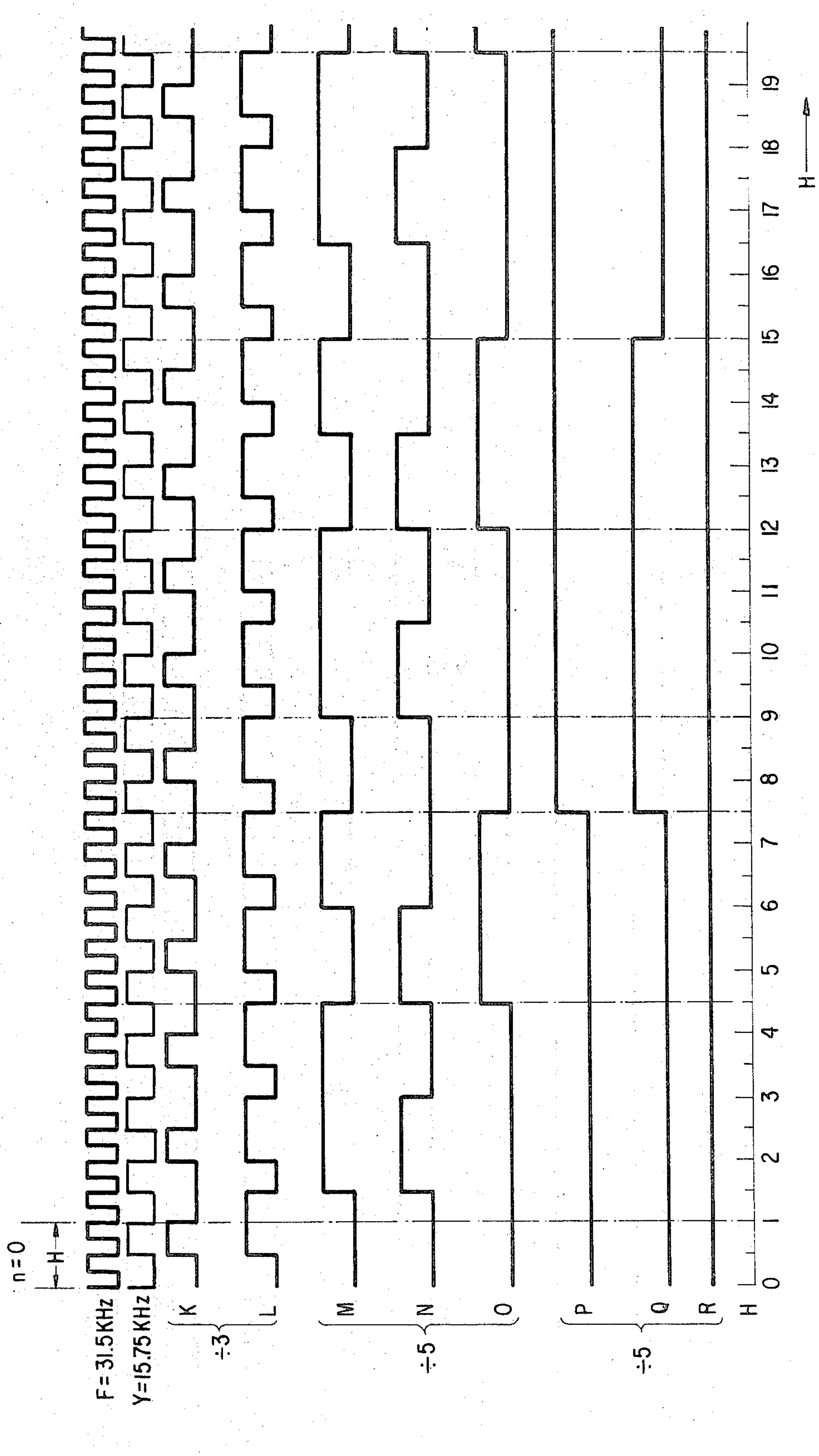
FIG. 4B illustrates the associated waveforms.

To produce the vertical frame signals, further counting down is performed by the vertical field countdown logic shown in FIG. 4A, with accompanying waveforms in FIG. 4B. JK flip-flops K and L produce a division by 3, followed by flip-flops M, N and O which produce a further division by 5 for a total division of 15. Flip-flops P, Q and R provide a further division of 5, yielding at the output of flip-flop R a total division of 75. NOR logic elements V associated with flip-flops S, T and U provide a further division by 7 to achieve the final division of 525. The output of bistable multivibrator U is the 60 HZ vertical frame timing signal. Waveforms corresponding to flip-flop outputs K through R are shown in FIG. 4B. Waveforms S, T and U are readily derivable and therefore not shown.

In general, the specific modulo counting logic systems may each be conventional, but the totality thereof must be selected to afford transistors between states at their respective outputs to generate the required timing for the further logic citcuits which produce the required EIA waveforms.

These further circuits are digital in nature, and in turn are controlled by the modulo counters and thus ultimately their outputs are controlled by the output of the single master oscillator, the frequency of which may be controlled precisely. Thus, the entire system affords extreme stability. The disclosed system also affords optimum utilization of the counters — i.e., the specific counter configurations, or interconnections of the stages of each counter are so selected that the transitions provide directly a majority of the required timing functions, and only a minimum of additional logic circuits are required in producing the required EIA waveforms.

The specifically disclosed embodiment of the invention is shown to use JK flip-flops, generally exhibiting the property that when either of the J or K inputs is low, or logic 0, they have no effect on the output, but do take effect when high, or logic 1. Further, all of the J, K and R inputs are effective as steady-state signals, whereas the clocking input C is effective on the trailing edge.

Figure 5A:
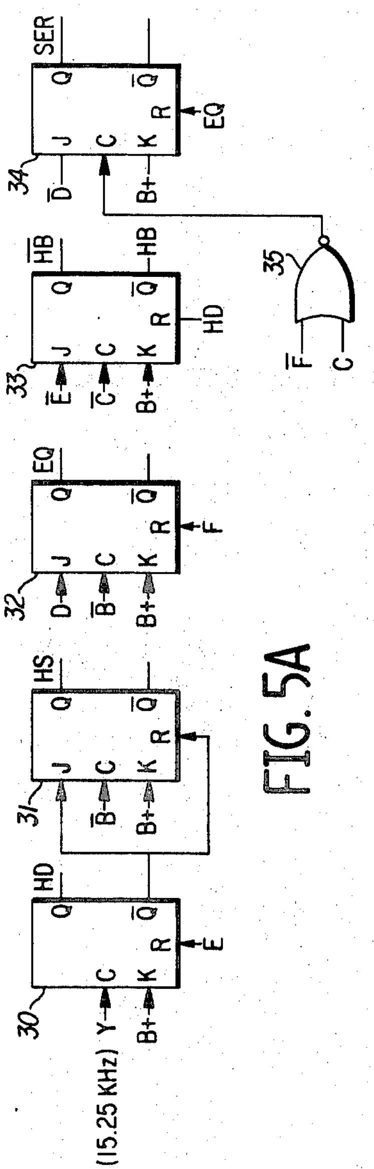
FIG. 5A is a block diagram of the JK flip-flop circuits employed in horizontal line processing.
Figure 5B:
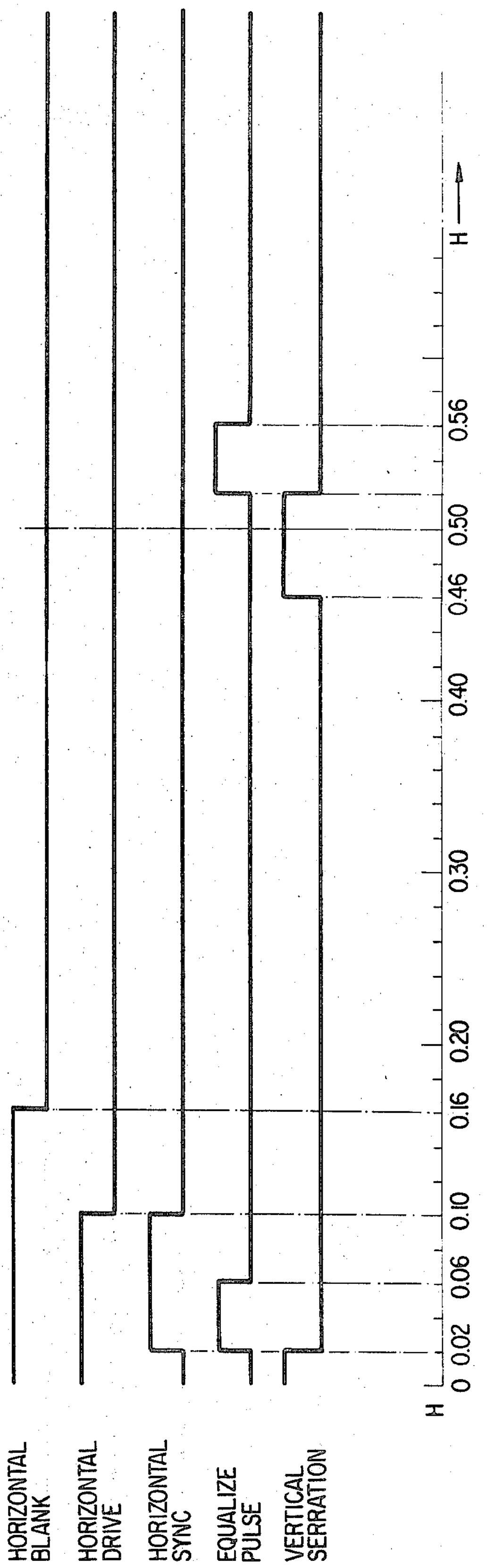
FIG. 5B illustrates the associated waveforms.

In FIG. 5A is shown the horizontal line processing logic for generating the horizontal synchronizing signals, as required by the EIA standards, and as are shown in FIG. 5B. In FIG. 5A, JK flip-flop 30 receives a clock input Y comprising the waveform Y output of JK flip-flop Y of FIG. 5A, and a reset input E comprising waveform E shown in FIG. 5B, the K input being maintained at B+ voltage corresponding to a logic 1, and produces the horizontal drive signal HD at its Q output. The Y input occurring at the horizontal line rate by definition, sets flip-flop 30 to logic 1 at time 0.10H (FIG. 3B) resetting flip-flop 30 and thus switching the Q output to logic 0. As a result, the horizontal drive pulse HD is produced as logic 1 from $t$=0 to $t$=0.10H in each horizontal line interval.

The horizontal sync signal HS produced at the Q output of JK flip-flop 31 results from the complement of horizontal drive $\overline{HD}$, applied to the R input thereof, and the B+, or logic 1, at input K.

The $\overline{Q}$, or $\overline{HD}$ input, as logic 0 from $t$=0 to $t$=0.10H has no effect, as noted, and thus the Q output is set to logic 1 at $t$=0.02H by the trailing edge of the first $\overline{B}$ pulse. Flip-flop 31 is reset by the $\overline{Q}$, or $\overline{HD}$ output of flip-flop 30 becoming logic 1 at $t$=0.10H, producing the requisite HS output of FIG. 5B of logic 1 from $t$=0.02H to $t$=0.10H.

The equalizing pulse signal EQ from the Q output of JK flip-flop 32 results from waveform D applied to the J input, waveform F applied to the reset input R, and $\overline{B}$ at the clock input C, all as shown in FIG. 5A, as well as a logical 1, or B+ at the K input. From FIG. 3B, for an initial interval from 0.00 to 0.30H, F=0 and from 0.00 to 0.10H, D=0, whereas B+=1 as a fixed input. As a result, $\overline{B}$, on its first trailing edge switches flip-flop 32 raising Q, or EQ, to logic 1 at $t$=0.02H, and again switches it, lowering Q, or EQ, to logic 0 at $t$=0.10H. Note that D and F serve to suppress any further response to $\overline{B}$, through $t$=0.50H — i.e., flip-flop 32 can respond to $\overline{B}$ only while both F and D are logic 0. F then resets flip-flop 32 at $t$=0.30H, until $t$ =0.50H, at which time the cycle repeats, again producing from 0.52H to 0.60H. EQ thus occurs at twice the horizontal line rate, as required.

The horizontal blank signal HB from the $\overline{Q}$ output of JK flip-flop 33 results from the horizontal drive signal HD applied to the reset input R, $\overline{E}$ at input J and $\overline{C}$ at clock input C, as illustrated in FIG. 5A, and a logical 1, or B+, at the K input. Here, HD resets flip-flop 33 at $t$=0, raising $\overline{Q}$ to logic 1, and from which HB is derived. Since B+ remains high at K, and $\overline{E}$ is logic 1 from 0.00 to 0.10H, $\overline{C}$ has no effect on the output. At $t$=0.10H, $\overline{E}$ becomes logic 0 and the next occurring $\overline{C}$ trailing edge, at $t$=0.16H, switches $\overline{Q}$, and thus HB, to 0 (and Q, and thus $\overline{HB}$, to 1). Flip-flop 33 maintains this state until the next HD reset input, and the cycle repeats.

The vertical serration signal SER from JK flip-flop 34 results from a clock signal supplied to the C input thereof and developed by a logic NORing of the signals $\bar{F}$ and C by NOR gate 35, a $\bar{D}$ input to J from FIG. 5A, the equalizing pulse signal EQ supplied to reset input R, and a logical 1 supplied to input K. Herein, EQ resets flip-flop 34 at $t$=0.02H, lowering Q, and thus SER, to logic 0. The input to clock terminal C is derived from NOR gate 35 which is inhibited, or dominated, by $\bar{F}$ which is logic 1 from 0.00 to 0.30H. Beginning at $t$=0.30H, gate 35 passes the C input, inverted and thus as $\bar{C}$, to clock input C. $\bar{D}$ remains logic 1 from 0.30H to 0.40H, whereby the output states remain unchanged. At $t$=0.40H, however, $\bar{D}$ becomes logic 0 and the next occurring trailing edge of $\bar{C}$, at $t$=0.46H, switches Q, and thus SER, to logic 1. At $t$=0.52H, EQ resets flip-flop 34, the Q output, and thus SER, becoming logic 0. This sequence repeats for the period $t$=0.96H to $t$=1.00H and into the next line at $t$=0.02H when EQ again resets, as shown in FIG. 5B. SER is therefore produced at twice the horizontal line rate, as is EQ, as required.

Figure 6A:
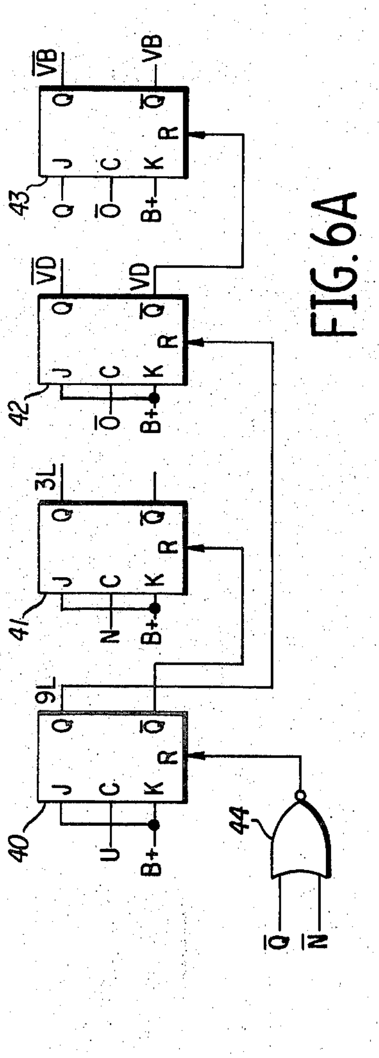
FIG. 6A is a block diagram of the JK flip-flop circuits employed in vertical field processing.
Figure 6B:
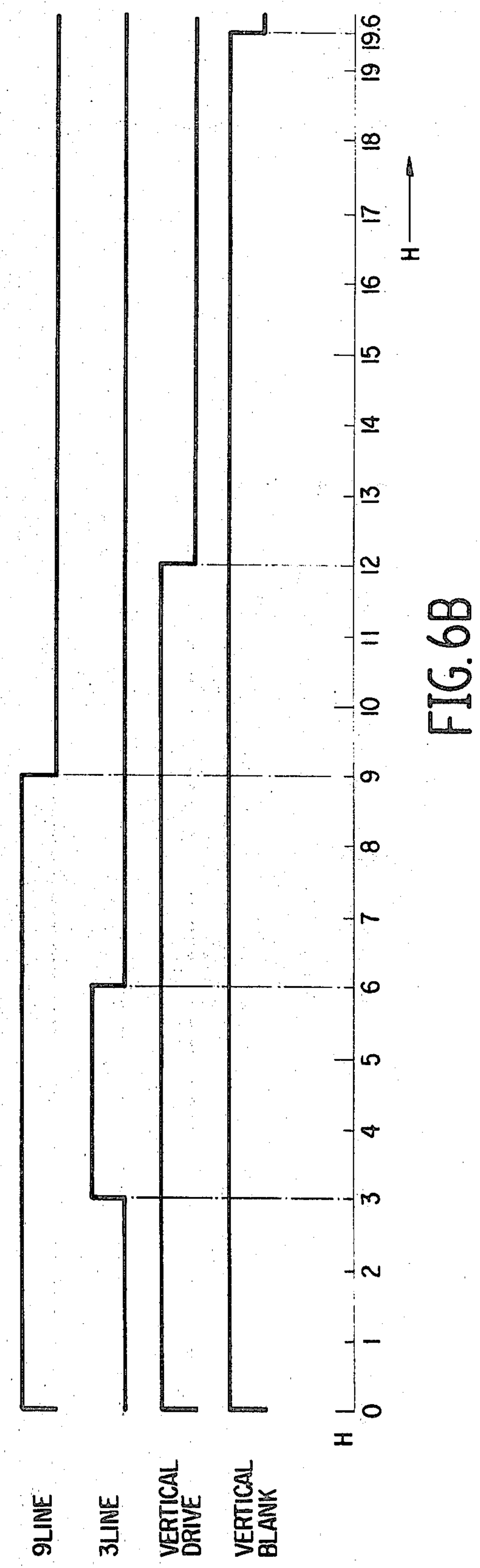
FIG. 6B illustrates the associated waveforms.

Vertical synchronizing signals are formed by the logic of FIG. 6A and are shown in FIG. 6B. The 9 line signal 9L IS produced at output Q of JK flip-flop 40 which receives at its reset input R the output of NOR gate 44 receiving $\bar{Q}$ and $\bar{N}$ as inputs, $\bar{Q}$ and $\bar{N}$ being shown in FIG. 4A, the signal U from FIG. 4A at its clock input C, and a logical 1 at the J and K inputs. Herein, the U signal provides a transition at the 60 cycle frame rate for switching output Q, and thus 9L, to logic 1, at $t$=0. Input signal $\bar{Q}$ changes from logic 1 to logic 0 at 7.5H, $\bar{N}$ thus being supplied through NOR gate 44 as N. N becomes logic 1 at 9H, resetting flip-flop 40 and lowering output Q, and thus 9L, to logic 0. This sequence then repeats at the 60 cycle frame rate, as controlled by U.

The 3 line signal is produced at output Q of JK flip-flop 41 which receives at its reset input R the complement of the 9 line signal 9L, or $\overline{9L}$, from the $\bar{Q}$ output of flip-flop 41, the N signal from FIG. 4A at its clock input C, and a logical 1 at the J and K inputs. In this circuit, N serves as a double trigger. Flip-flop 41 is maintained in the reset condition by the $\bar{Q}$ output of flip-flop 40, which is logic 1 except for the 9L interval, when $\bar{Q}$ is logic 0. The successive trailing edges of N at $t$=3H and $t$=6H serve, respectively, to switch Q and thus 3L, to 1 and back to 0, producing the 3L waveform of FIG. 6B in each frame.

The vertical drive signal VD is produced at the $\bar{Q}$ output of JK flip-flop 42 which receives the 9 line signal 9L at its reset input R, an $\bar{O}$ input to clock C and a $\bar{Q}$ input to J, C and J being shown in FIG. 4A, and a logical 1 at input K. Flip-flop 42 is reset at $t$=0 by 9L, maintaining Q at 0 and $\bar{Q}$, and thus VD at 1, through 9H. The next occurring trailing edge of $\bar{O}$, at $t$=12H, switches $\bar{Q}$ to 0, successive $\bar{O}$ inputs maintaining $\bar{Q}$, and thus VD, at 0 until reset by 9L in the next frame, when the sequence repeats.

Finally, the vertical blanking signal VB is produced at the $\bar{Q}$ output of flip-flop 43, the latter receiving the Q signal at input J, B+ at K, $\bar{O}$ at clock input C and VD at reset input R. A similar operation to that of flip-flop 42 results, VD resetting flip-flop 43 at $t$=0 to raise $\bar{Q}$ and thus VB to 1, maintaining it at 1 through $t$=12H. Signal Q (at logic 1 from prior to 12H to 15H) serves to inhibit the $\bar{O}$ clock input through 15H and thus until the next occurring trailing edge of $\bar{O}$ at $t$=19.5H, at which time the Q output, and thus VB, is lowered to logic 0, at which it remains for the duration of the frame, the sequence repeating for successive VD reset inputs.

The transitions afforded at the outputs of selected ones of the stages of the plurality of modulo counters and which afford the necessary timing functions to establish the desired pulse widths, or intervals, and the relative timing of those intervals may be appreciated more fully by a summary of the foregoing description of the generation of the required synchronization signals. The HD interval is defined by E, its timing being defined by Y; accordingly, the HD interval is derived directly from the interval of the E waveform. The HS signal requires a single additional logic step in that it is initated by $\bar{B}$ and thus at 0.02H and thereafter it is maintained through termination by HD (actually $\overline{HD}$). The HB interval is defined in large part by the HD interval with two further logic functions; specifically, HB is initiated and maintained in part by HD, for the duration of HD, E maintains HB beyond the termination of HD by suppressing any response to the clocking input $\bar{C}$, and the termination of HB is defined by the trailing edge transition of $\bar{C}$ following the end of $\bar{E}$. The EQ interval is defined in duration by two successive transitions, or trailing edges, of $\bar{B}$, the timing of the interval being controlled by D and F through their effect of suppressing response to $\bar{B}$ trailing edges outside of the required time period of the desired EQ interval. Further, since D and F repeat at twice the horizontal line rate, EQ, as is required, is likewise produced at twice the horizontal line rate.

The SER interval is initiated by a clocking transition of $\bar{C}$, selected and controlled in time by the inhibiting and suppressing effects of $\bar{F}$ and $\bar{D}$ and then is terminated by the trailing edge transition of $\overline{EQ}$. As before noted, the D and F transitions repeat at twice the horizontal line rate, as do the complements $\bar{D}$ and $\bar{F}$, thereby to enable the switching function of the clocking input $\bar{C}$ at twice the horizontal line rate for initiating SER intervals at twice the horizontal line rate with the necessary termination of those intervals afforded by the EQ waveforms likewise occurring at twice the horizontal line rate as before noted.

A similar analysis may be made of the frame synchronizing signals. The 9L signal is initiated in each frame by the 60 cycle frame rate signal U and is terminated by the transistion of N applied as a steady state reset signal, for that transition next following the termination of the interval of the signal $\bar{Q}$. The 3L interval is defined in duration by two trailing edge transitions of the signal N, serving as a double trigger and which are effective during the interval of 9L only. The VD interval is initiated by 9L and maintained by 9L through its termination suppressing response to the clocking function of the intervening trailing edge transitions of $\bar{O}$ whereby the next occurring trailing edge transition of $\bar{O}$ terminates the E. The VB interval is initiated by the VD interval and maintained by the VD through its termination and further by Q through its termination, VD and Q jointly serving to effectively suppress response to intervening transitions of $\bar{O}$ such that the trailing edge transition of $\bar{O}$ next following termination of Q affords a clocking function to terminate VB.

The foregoing summary therefore demonstrates that the transitions in the outputs of the stages of the counter either directly, as in the case of positive and negative going transitions themselves defining the interval of the output of a counter stage, or indirectly through utilization of intervals directly derived from counter stage outputs in combination with other transitions, as afforded through a minimum number of additional logic functions, provides all necessary synchronization intervals in formulating the desired EIA signal format.

Figure 7:
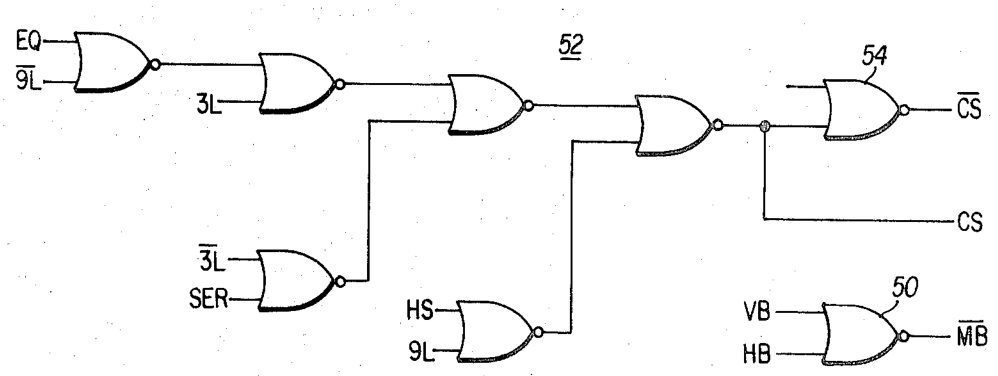
FIG. 7 is a block diagram of the logic elements used to form the composite sync and mixed blanking waveforms.
Figure 8:
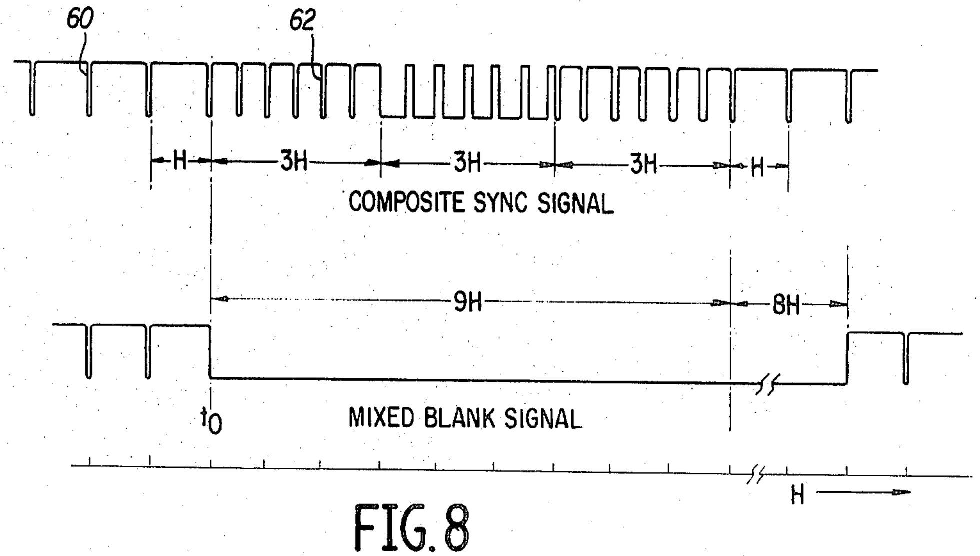
FIG. 8 is a chart illustrating detailed features of the composite sync and mixed blanking waveforms.

The composite sync and mixed blank signals, shown as CS and MB in FIGS. 7 and 8, are formed from the horizontal and vertical signals. The modulo approach logically combines these signals using NOR circuits. FIG. 7 shows the logic to form composite sync CS and its complement $\overline{CS}$, and the complement of mixed blank, or $\overline{MB}$. The vertical blank signal VB and the horizontal blank signal HB are supplied to NOR gate 50 to produce the mixed blank signal MB. Recalling that a NOR circuit produces a logical 0 when either input is a logical 1, the proper horizontal and vertical timing signals are logically combined by the group of NOR gates generally referenced by 52, to produce the composite sync signal as required by EIA standards. NOR gate 54 operates to invert the composite sync signal CS and thereby provide its complement $\overline{CS}$.

Referring to FIG. 8, the true state of the composite sync signal is its high level and the not true, or complementary, state is its low level. It is therefore seen in FIG. 8 that the composite sync signal CS contains horizontal sync puses 60, equalizing pulses 62, and the 3H intervals required by the EIA standards. The complement of the mixed blank signal, $\overline{MB}$, shown in FIG. 8, results from the NORing of the vertical blank signal VB and the horizontal blank signal HB, as shown in FIG. 7. It is noted that the vertical blank signal VB defines a period of 16H and the horizontal blank signal HB defines a period of approximately 1H, to provide a mixed blank signal MB of 17H as shown in FIG. 8, thereby satisfying the EIA standards requirements. The horizontal blank signal HB continues at the horizontal line frequency, thereby to supply blanking signals at successive periods 1H as shown in FIG. 8.

The specifically disclosed modulo counter configurations and associated logic processing circuitry afford what is believed to be optimum, or at least near optimum, utilization of the modulo counter technique of the present invention, thereby affording generation of the required EIA signal format with a minimum number of component elements and minimum complexity of the associated logic processing circuitry. Alternative digital sync generation systems may be envisaged utilizing modified modulo counter arangements while affording the necessary transitions to enable defining the required timing and duration of the requisite synchronization pulse intervals in accordance with the digital approach of the present invention. Such alternative embodiments for achieving the digital synchronization generation concept and technique of the present invention are considered to fall within the spirit and scope of this invention, the specifically disclosed embodiment of the invention being believed, however, to represent an optimum, or near optimum, design in accordance with the invention. Accordingly, it is intended by the appended claims to cover all such modifications and adaptations of the present invention as fall within the true spirit and scope of the invention.

What is claimed is:

1. A digital sync generation system for generating synchronization and blanking signals in accordance with the standard EIA format and comprising:

a clock oscillator having a frequency defined by the smallest time interval required to be produced, a first plurality of modulo counters receiving at an input thereto the clocking signal from said clock oscillator and providing a first output, an additional modulo counter stage receiving said first output and providing a horizontal line rate output, a second plurality of modulo counters receiving the first output and providing a frame rate sync signal output, flip-flop means receiving the rate signal as a clocking input and the output of an intermediate one of said second plurality of counters as a reset signal to produce a horizontal drive signal, and flip-flop means receiving the complement of a horizontal drive signal as a reset input and the output of an intermediate one of said second plurality of counters as a clocking signal to produce a horizontal sync signal.

2. A digital sync generation system as recited in claim 1 wherein there is further provided flip-flop means receiving the complement of said intermediate one of said second plurality of counters and the complement of said first output as setting and clocking inputs and the horizontal drive signal as a reset input for producing a horizontal blanking signal.

3. A digital sync generation system as recited in claim 2 wherein there is provided a further flip-flop receiving an output of an initial counter of said second plurality and the complement of the output of an intermediate one of said first plurality of counters as setting and clocking inputs thereto and the first output of said first plurality of counters as a resetting signal to produce an equalizing pulse output.

4. A digital sync generation system as recited in claim 3 wherein there is further provided:

a logic NOR gate receiving said first output of said first plurality of counters and the first output of said second plurality of counters, and a further flip-flop receiving the complement of the output of an initial of one said second plurality of counters and the output of said NOR gate as setting and clocking inputs thereto respectively and the equalizing pulse as a reset input thereto to produce the vertical serration signal.

5. A digital sync generation system as recited in claim 4 wherein a further succession of flip-flops receive outputs of said second plurality of modulo counters and respectively produce the 9 line, 3 line, vertical drive, and vertical blanking signals, and there is further provided:

first logic combination means for receiving the individual synchronization signals and producing a composite sync signal, and second logic combining means for receiving the blanking signals and producing a mixed blanking signal.

6. A system as recited in claim 5, wherein the synchronization and blanking signals are designed to conform to EIA standard format requirements including equalization, serration, horizontal sync and 3 line and 9 line signals and vertical and horizontal blanking signals and wherein:

said first logic combination means includes first, second and third logic NOR gates receiving the equalization and the complement of the 9 line signal, the complement of the 3 line signal and the serration signal, and the horizontal sync and the 9 line signal, respectively, a fourth logic NOR gate receiving the output of the first NOR gate and the 3 line signal, a fifth logic NOR gate receiving the outputs of the first and second NOR gates, and a sixth logic NOR gate receiving the outputs of the third and fourth NOR gates and producing a composite sync output, and said second logic combination means comprises a further NOR gate receiving as inputs the vertical blanking and horizontal blanking signals and producing as an output the complement of the required mixed blanking signals.

7. A digital sync generation system as recited in claim 1 for generation of horizontal line synchronziation signals in accordance with the standard EIA format, wherein:

said clock oscillator generates a clock frequency of 787.5 KHZ, and said plurality of successive modulo counters includes a first ÷5 modulo counter comprising stages A, B and C, a second ÷5 modulo counter comprising stages D, E and F, each of said stages providing correspondingly identified outputs, and providing an output signal F of 31.5 KHZ, and a ÷2 counter comprising a single stage Y providing at its output a horizontal line rate signal Y of 15.75KHZ.

8. A system as recited in claim 7 for providing a horizontal drive signal and comprising a flip-flop of the JK type receiving the Y signal as a clock input, a steady logic 1 as an input to K, and the E signal is a reset input and providing the horizontal drive signal at its output.

9. A system as recited in claim 8 for generating a horizontal sync signal comprising:

a further JK flip-flop receiving at the J and reset inputs thereof the complement output of the horizontal drive flip-flop and receiving the complement of the B signal as a clocking input, the K input receiving a steady logic 1 input and producing the horizontal sync signal as its output.

10. A digital sync generation system as recited in claim 8 for producing a horizontal blank signal comprising:

a further flip-flop of the JK type receiving at its J input a complement of the E signal, at its clock input a complement of the C signal, at its K input a steady logic 1, and the horizontal drive signal at its reset input, and producing the horizontal blank signal at its output.

11. A digital sync generation system as recited in claim 7 for producing an equalization signal and comprising:

a flip-flop of the JK type receiving at its J input and the D signal, at its clocking input the complement of the B signal, and at its K input a steady logic 1, and at its reset input the F signal, and producing the equalization signal at its output.

12. A system as recited in claim 11 for generating the vertical serration signal and comprising:

a flip-flop of the JK type and logic NOR gate, and flip-flop receiving at its J input the complement of the D signal, at its clocking input the output of said NOR gate, the latter in turn receiving the complement of F and the C signal, at its K input a steady logic 1, and at its reset input the equalization signal, and producing the vertical serration signal at its output.

13. A system as recited in claim 1 for the generation of field synchronization signals including 9 line, 3 line, vertical drive and vertical blank signals of the standard EIA television format, wherein:

said plurality of modulo counters includes first counters for counting down the clock frequency produced by said clock oscillator for supplying a clock pulse train of 31.5 KHZ, said plurality of modulo counters further includes a succession of counters receiving the 31.5 KHZ clock signal, comprising: a 3 counter comprising stages K and L, a 5 counter comprising stages M and N and 0, a further 5 counter comprising stages P, Q and R, and a 7 counter comprising stages S, T and U, each of said stages producing a correspondingly identified output signal, and the U signal comprising a 60 KHZ signal of the desired vertical frame rate.

14. A system as recited in claim 13 for producing 9 line signals of the EIA format and comprising:

a flip-flop of the JK type and a logic NOR gate, said flip-flop receiving the U signal as a clocking input, a steady logic 1 at its K input, and the output of said NOR gate as its R input, said NOR gate in turn receiving the complements of the U and N signals, and said flip-flop producing at its output the 9 line signal.

15. A system as recited in claim 14 for producing the 3 line signal and comprising:

a further flip-flop of the JK type receiving at its clocking input the N signal, at its K input a steady logic 1, and at its R input the complement of the 9 line output from the 9 line flip-flop.

16. A system as recited in claim 14 for producing the vertical drive signal and comprising:

a flip-flop of the JK type receiving the complement of the 0 signal at its clocking input, a steady logic 1 at its K input, and the 9 line signal at its R input and producing the vertical drive signal at its output.

17. A system as recited in claim 16 for producing the vertical blank signal and comprising:

a flip-flop of the JK type receiving the Q signal at its J input, the complement of the 0 signal at its clocking input, a steady logic 1 at its K input, and the vertical drive signal at its R input and producing the vertical blanking signal at its output.

18. A digital sync generation circuit for generating synchronization and blanking signals in accordance with the standard EIA format and comprising:

a master oscillator producing a clock output of frequency 787.5 KHZ, a first ÷5 modulo counter comprising stages A, B and C, and a second ÷5 modulo counter comprising D, E and F, and a ÷2 modulo counter comprising a single stage Y, each stage comprising a flip-flop of the JK type and producing a correspondingly identified output, and wherein:

stage A and stage B receive the master oscillator clocking signal at the clocking inputs thereof, stage A receives the B signal at its K input, stage C receives the A signal as its clocking input, stage D and stage E receive the C signal as the clocking input and stage B receives the C signal at its J input, stage D receives the E signal at its K input, stages E and Y receive the F signal at their J and clocking inputs, respectively, and the Y signal output of stage Y comprises the horizontal line frequency of 15.75 KHZ.

19. A system as recited in claim 18 for providing a horizontal drive signal and comprising a flip-flop of the JK type receiving the Y signal as a clock input, a steady logic 1 as an input to K, and the E signal is a reset input, and providing the horizontal drive signal at its output.

20. A system as recited in claim 19 for generating a horizontal sync signal comprising:

a further JK flip-flop receiving at the J and reset inputs thereof the complement output of the horizontal drive flip-flop and receiving the complement of the B signal as a clocking input, the K input receiving a steady logic 1 input and producing a horizontal sync signal as its output, and producing the horizontal sync signal at its output.

21. A digital sync generation system as recited in claim 19 for producing a horizontal blank signal comprising:

a further flip-flop of the JK type receiving at its J input a complement of the E signal, at its clock input a complement of the C signal, at its K input a steady logic 1, and the horizontal drive signal at its reset input, and producing the horizontal blank signal at its output.

22. A digital sync generation system as recited in claim 18 for producing an equalization signal and comprising:

a flip-flop of the JK type receiving at its J input the D signal, at its clocking input the complement of the B signal, and at its K input a steady logic 1 and at its reset input the F signal, and producing the equalization signal at its output.

23. A system as recited in claim 22 for generating the vertical serration signal and comprising:

a flip-flop of the JK type and a logic NOR gate, the flip-flop receiving at its J input the complement of the D signal, at its clocking input the output of said NOR gate in turn receiving the complement of F and the C signal, at its K input a steady logic 1, and at its reset input the equalization signal, and producing the vertical serration signal at its output.

24. A system as recited in claim 18 furthermore providing for generation of field synchronizing signals and comprising:

a ÷3 modulo counter comprising stages K and L, a ÷5 modulo counter comprising stages M, N and O, a ÷5 modulo counter comprising stages P, Q and R, and a ÷7 modulo counter including stages S, T and U, each said stage comprising a flip-flop of the JK type and producing corresponding output signals, and wherein:

said K and L states receive the F signal ans a clocking input and the L stage receives the K signal at its K input, the L signal being supplied to the J input of the K flip-flop and to the clocking inputs of the M and N flip-flops, the N signal being supplied to the K input of the M flip-flop and the 0 signal to the J input of the N flip-flop and the clocking input of the P and Q flip-flops, the Q signal being supplied to the K input of the P flip-flop, the P signal being supplied to the clocking input of the R flip-flop and the output R signal thereof being supplied to the J input of the Q flip-flop and the clocking inputs of the S and T flip-flops, and there are furthermore provided first and second 2 input NOR gates associated with the ÷7 counter, the inputs to the first thereof comprising the output of the second NOR gate and the S signal, and the inputs to the second NOR gate comprising the T and U signals with the output of the first NOR gate being supplied to the J and K inputs of the P flip-flop and the output of the second NOR gate being supplied to the K input of the S flip-flop, the U flip-flop receiving the complement of the T signal as a clocking input and producing a 60 HZ field rate signal at its output.

25. A system as recited in claim 24 for producing 9 line signals of the EIA format and comprising:

a flip-flop of the JK type and a logic NOR gate, said flip-flop receiving the U signal as a clocking input, a steady logic 1 at its K input, and the output of said NOR gate as its R input, said NOR gate in turn receiving the complements of the U and N signals, and said flip-flop producing at its output the 9 line signal.

26. A system as recited in claim 25 for producing the 3 line signal and comprising:

a further flip-flop of the JK type receiving at its clocking input the N signal, at its K input a steady logic 1, and at its R input the complements of the 9 line output from the 9 line flip-flop.

27. A system as recited in claim 25 for producing the vertical drive signal and comprising:

a flip-flop of the JK type receiving the complement of the 0 signal at its clocking input, a steady logic 1 at its K input, and the 9 line signal at its R input and producing the vertical drive signal at its output.

28. A system as recited in claim 27 for producing the vertical blank signal and comprising:

a flip-flop of the JK type receiving the Q signal at its J input, the complement of the 0 signal at its clocking input, a steady logic 1 at its K input, andthe vertical drive signal at its R input and producing the vertical blanking signal at its output.

* * * * *